Figure 1:
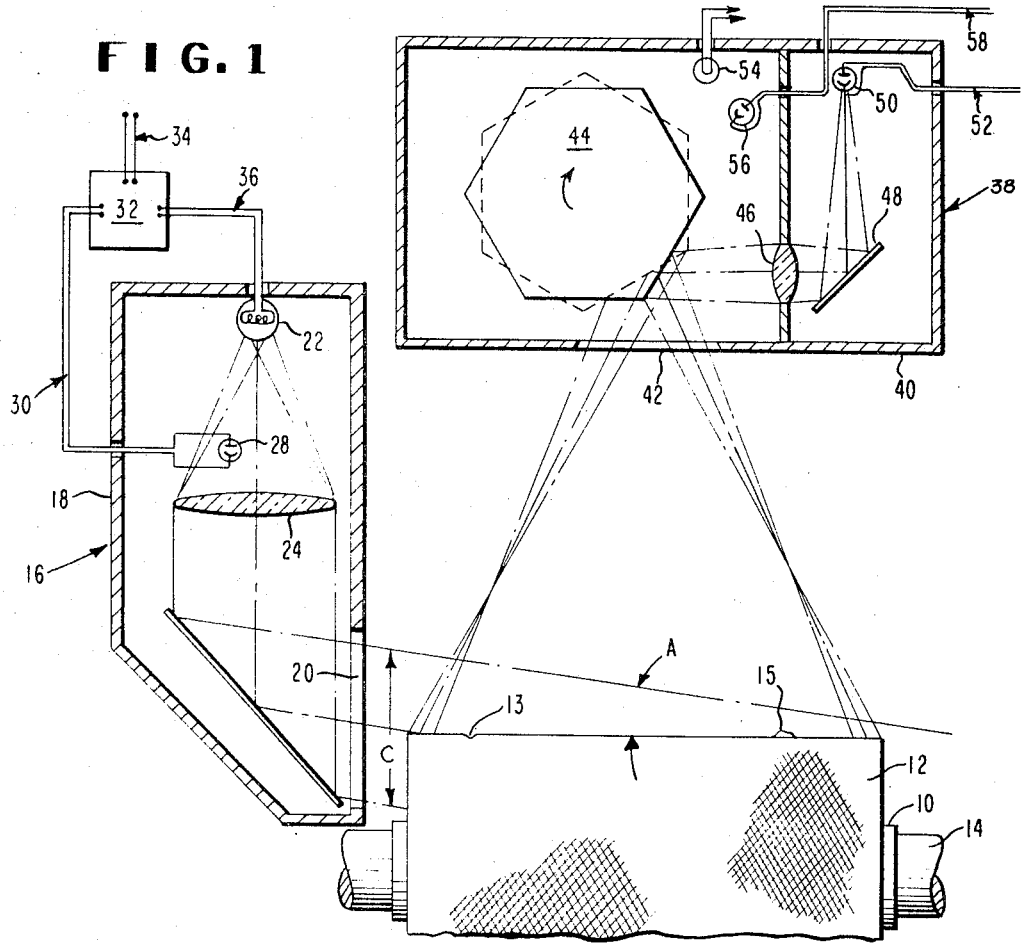
Figure 3:
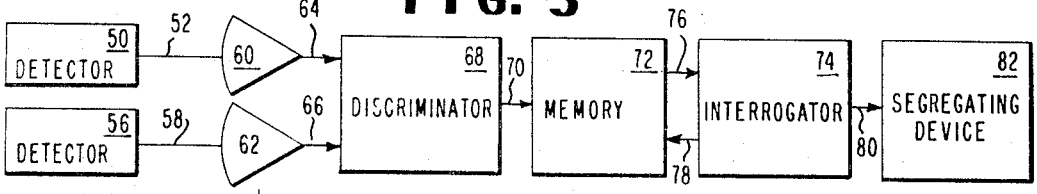
Figure 2:
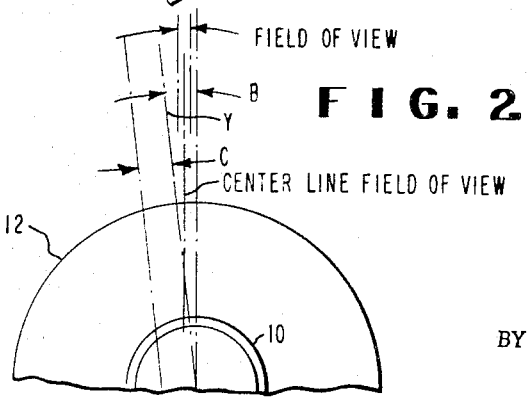

T861053

DEFENSIVE PUBLICATION

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED APRIL 29, 1969

861 O.G. 1356

702,459

PHOTOELECTRIC SCANNER FOR DETECTING RIDGES AND INDENTATIONS IN A YARN PACKAGE

Gerald Irving Buckson, Newark, and John Albert Masino and Stanley Victor Williams, Wilmington, Del., assignors to E. I. du Pont de Nemours and Company, Wilmington Del., a corporation of Delaware

Filed Feb. 1, 1968. Published Apr. 29, 1969
Int. Cl. G01n *21/30;* H01j *39/12;* G01b *11/30*
U.S. Cl. 250—219
1 Sheet Drawing. 10 Pages Specification

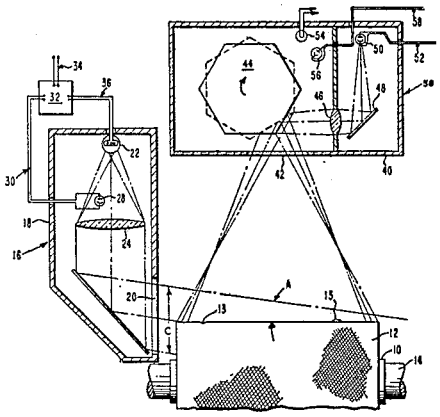

An apparatus for simultaneously measuring ridges and indentations in the peripheral surface of a rotating cylindrical yarn package wherein a ribbon of light is projected axially across the surface of the package at an angle with respect to the longitudinal axis of the package to cast shadows corresponding to the ridges and indentations. The illuminated portion of the package surface is scanned in a non-specular plane and the light reflected from the package surface in the non-specular plane is redirected to a photosensitive means which detects ridges and indentations in the surface of the package through variations in intensity of the redirected light.

April 29, 1969 G. I. BUCKSON ET AL DEF. PUB. T861053

PHOTOELECTRIC SCANNER FOR DETECTING RIDGES AND INDENTATIONS IN A YARN PACKAGE SN-702459

Filed Feb. 1, 1968

INVENTORS

GERALD IRVING BUCKSON
JOHN ALBERT MASINO
STANLEY VICTOR WILLIAMS

BY Howard P. West Jr.
ATTORNEY